United States Patent
Jewhurst et al.

(10) Patent No.: US 9,423,532 B2
(45) Date of Patent: *Aug. 23, 2016

(54) ANTI-REFLECTION COATINGS WITH AQUEOUS PARTICLE DISPERSIONS AND METHODS FOR FORMING THE SAME

(71) Applicant: Intermolecular Inc., San Jose, CA (US)

(72) Inventors: Scott Jewhurst, Redwood City, CA (US); Nikhil Kalyankar, Mountain View, CA (US)

(73) Assignee: Intermolecular, Inc., San Jose, CA (US)

( * ) Notice: Subject to any disclaimer, the term of this patent is extended or adjusted under 35 U.S.C. 154(b) by 423 days.

This patent is subject to a terminal disclaimer.

(21) Appl. No.: 13/973,858

(22) Filed: Aug. 22, 2013

(65) Prior Publication Data

US 2014/0272384 A1    Sep. 18, 2014

Related U.S. Application Data

(60) Provisional application No. 61/777,995, filed on Mar. 12, 2013.

(51) Int. Cl.
| | |
|---|---|
| *G02B 1/11* | (2015.01) |
| *G02B 1/113* | (2015.01) |
| *C09D 5/00* | (2006.01) |
| *G02B 5/02* | (2006.01) |
| *G02B 1/12* | (2006.01) |

(52) U.S. Cl.
CPC ............... *G02B 1/113* (2013.01); *C09D 5/006* (2013.01); *G02B 5/0294* (2013.01); *G02B 1/12* (2013.01); *G02B 2207/107* (2013.01); *G02B 2207/109* (2013.01); *Y10T 428/25* (2015.01); *Y10T 428/259* (2015.01)

(58) Field of Classification Search
CPC .................... G02B 1/113–1/118; C09D 5/006
See application file for complete search history.

(56) References Cited

U.S. PATENT DOCUMENTS

| | | | |
|---|---|---|---|
| 2001/0003358 A1 * | 6/2001 | Terase ..................... | C01B 33/12 252/62 |
| 2006/0269724 A1 * | 11/2006 | Ohashi .................... | G02B 1/111 428/143 |
| 2012/0009429 A1 | 1/2012 | Shmueli | |

OTHER PUBLICATIONS

Oxford English Dictionary—curing definition, 2015, Oxford University Press.*

(Continued)

*Primary Examiner* — Elizabeth A Robinson

(57) ABSTRACT

Embodiments provided herein describe coating formulations, such as those used to form optical coatings, panels having optical coatings thereon, and methods for forming optical coatings and panels. The coating formulation includes an aqueous-based suspension of particles. The particles have a sheet-like morphology and a thickness of less than about 10 nm. The coating also includes a polysiloxane or silane emulsion, a polysiloxane or silane solution, or a combination thereof.

20 Claims, 6 Drawing Sheets

(56) References Cited

OTHER PUBLICATIONS

An et al., Preparation and self-assembly of carboxylic acid-functionalized silica, Mar. 3, 2007, Journal of Colloid and Interface Science 311 (2007) pp. 507-513.*

Lellouch et al., Antibiofilm activity of nanosized magnesium fluoride, Aug. 7, 2009, Biomaterials 30 (2009) pp. 5969-5978.*

Herman Z. Cummins; Liquid Glass Gel the Phases of Colloidal Laponite; Aug. 30, 2007; City College of CUNY; Unknown.

Hiroki Takeuchi et al.; Reinforcement of Polydimethylsiloxane Elastomers by ChainEnd Anchoring to Clay Particles; Feb. 17, 1999; Macromolecules; Unknown.

Bettina V. Lotsch et al.; Photonic Clays a New Family of Functional 1D Photonic Crystals; Jan. 1, 2008; University of Toronto; Unknown.

Jason H. Rouse, et al.; SolGel Processing of Ordered Multilayers to Produce Composite Films of Controlled Thickness; Apr. 8, 2000; Lehigh University; Unknown.

* cited by examiner

ANTI-REFLECTION COATINGS WITH AQUEOUS PARTICLE DISPERSIONS AND METHODS FOR FORMING THE SAME

CROSS-REFERENCE TO RELATED APPLICATION

This application claims priority to U.S. Provisional Patent Application No. 61/777,995, filed Mar. 12, 2013, entitled "Sol-Gel Coatings," which is incorporated by reference herein in its entirety.

TECHNICAL FIELD

The present invention relates to optical coatings. More particularly, this invention relates to optical coatings that improve, for example, the anti-reflection performance of transparent substrates and methods for forming such optical coatings.

BACKGROUND OF THE INVENTION

Inorganic nano-particle and xerogel-based anti-reflection (or anti-reflective) coatings (ARCs), produced using sol-gel chemistry wet deposition techniques, typically suffer from poor "green" film (i.e., gelled, but still wet) mechanical and chemical durability, which results in fragile coatings that must be handled with great care prior to fully curing through high temperature thermal processing.

The lack of durability of the coatings at this stage or processing are due to the weak bonding (e.g., dominantly H-bonding) found in the green films, the low interfacial contact area between the spherical or/and elongated nano-particles that form the film and between the coating and the substrate (i.e., the interfacial contact area), and the open porosity which is typical of such coatings.

The low interfacial contact area and open porosity often result in coatings with poor durability even after thermally curing, as sufficient temperatures for adequately sintering the nano-particle or xerogel coatings requires processing temperatures which exceed the acceptable limits for the glass substrates to which these coatings are typically applied. Polymeric sol-gel binders have been used to improve both the green and cured film strength by acting as a cement between the various contact points and increase the effective interfacial area. However, such binders typically reduce the porosity of the coatings, thus increasing the refractive index.

Additionally, poor conformality is often exhibited by most xerogel anti-reflection coatings, which limits performance on textured glass substrates often used in photovoltaic applications. Further, xerogel anti-reflection coatings require expensive organic solvent-based formulations to be compatible with the sol-gel chemistry used to form the nano-particle film or the binder, which often produce volatile organic carbon (VOC) emissions and hazardous waste (e.g., fire hazards, toxic hazards, etc.).

BRIEF DESCRIPTION OF THE DRAWINGS

To facilitate understanding, identical reference numerals have been used, where possible, to designate identical elements that are common to the figures. The drawings are not to scale and the relative dimensions of various elements in the drawings are depicted schematically and not necessarily to scale.

The techniques of the present invention can readily be understood by considering the following detailed description in conjunction with the accompanying drawings, in which.

DETAILED DESCRIPTION

A detailed description of one or more embodiments is provided below along with accompanying figures. The detailed description is provided in connection with such embodiments, but is not limited to any particular example. The scope is limited only by the claims and numerous alternatives, modifications, and equivalents are encompassed. Numerous specific details are set forth in the following description in order to provide a thorough understanding. These details are provided for the purpose of example and the described techniques may be practiced according to the claims without some or all of these specific details. For the purpose of clarity, technical material that is known in the technical fields related to the embodiments has not been described in detail to avoid unnecessarily obscuring the description.

The term "horizontal" as used herein will be understood to be defined as a plane parallel to the plane or surface of the substrate, regardless of the orientation of the substrate. The term "vertical" will refer to a direction perpendicular to the horizontal as previously defined. Terms such as "above", "below", "bottom", "top", "side" (e.g. sidewall), "higher", "lower", "upper", "over", and "under", are defined with respect to the horizontal plane. The term "on" means there is direct contact between the elements. The term "above" will allow for intervening elements.

Embodiments described herein provide optical coatings, and methods for forming optical coatings, that improve the anti-reflective performance of, for example, transparent substrates. In some embodiments, this is accomplished by using water-based suspensions of sheet-like particles, or "sheet particles," in the optical coatings. The thickness of the sheet particles is relatively small compared to the length and width of the particles. The sheet particles form durable coatings in which the particles may be arranged in an irregular manner, resulting in porosity within the coating. In some embodiments, a polysiloxane or silane emulsion, a polysiloxane or silane solution, or a combination thereof is used as a binder, and in some embodiments, a surfactant as well.

Figure 1:
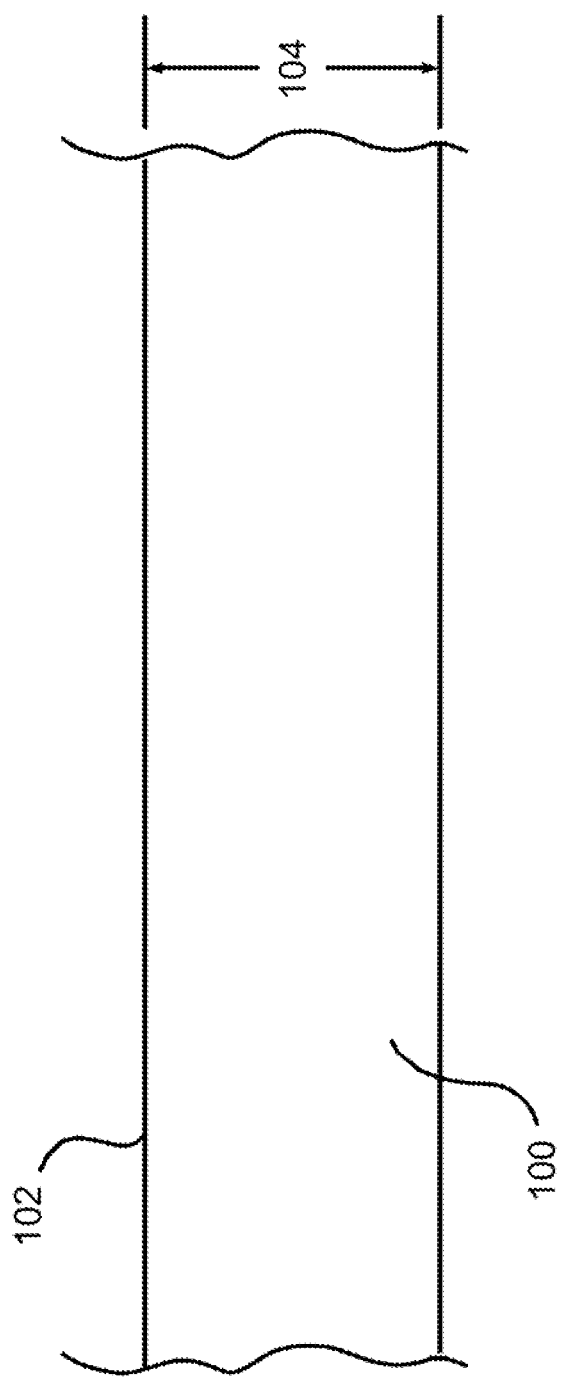
FIG. 1 is a cross-sectional view of a substrate.

FIG. 1 illustrates a transparent substrate 100 according to some embodiments. In some embodiments, the transparent substrate 100 is made of glass and has an upper surface 102 and a thickness 104 of, for example, between 0.1 and 2.0 centimeters (cm). Although only a portion of the substrate 100 is shown, it should be understood that the substrate 100 may have a width of, for example, between 5.0 cm and 2.0 meters (m). In some embodiments, the substrate 100 is made of a transparent polymer, such as polyethylene terephthalate (PET), poly(methyl methacrylate) (PMMA), polycarbonate (PC), and polyimide (PI). In some embodiments, an optical coating, as described below, is formed above the substrate 100 to create a coated article.

Figure 2:
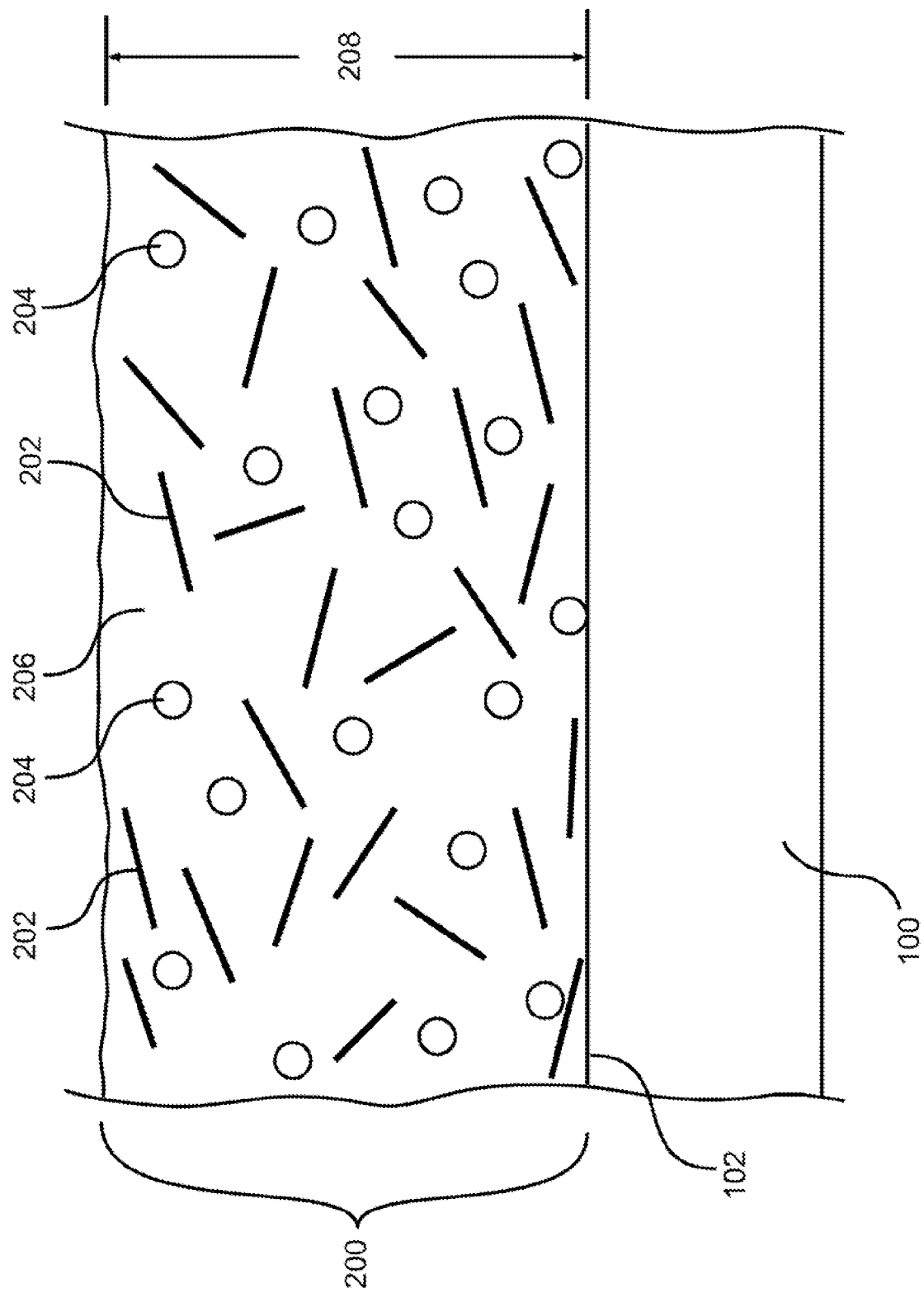
FIG. 2 is a cross-sectional view of the substrate of FIG. 1 with a coating formulation applied thereto according to some embodiments of the present invention.

FIG. 2 illustrates the transparent substrate 100 with a coating formulation 200 deposited above the upper surface 102. In some embodiments, the coating formulation 200 is a sol-gel formulation and is applied using, for example, spin coating, spray coating, slot-die coating, curtain coating, meniscus coating, dip coating, roller coating, draw down coating, or doctor blade coating. In some embodiments, the coating formulation 200 is applied directly to the upper surface 102 of the substrate 100. However, in other embodiments, other materials or layers may be formed between the substrate 100 and the coating formulation 200. In some embodiments, the coating formulation 200 includes sheet-shaped particles (or sheet particles or nano-sheets) 202, nano-particles 204, and a binder material (or binder) 206.

It should be noted that FIG. 2 illustrates the coating formulation 200 before curing, and as such, the sheet particles 202 and the nano-particles 204 are spaced apart. It should also be understood that the binder material 206 as it is shown in FIG. 2 may include various liquids, such as water, in addition to the particular binder material(s) used in the coating formulation 200. Thus, a thickness 208 of the coating formulation 200, as shown in FIG. 2, may be substantially greater than that of the optical coating that is to be formed on the transparent substrate 100, as described below.

Figure 3:
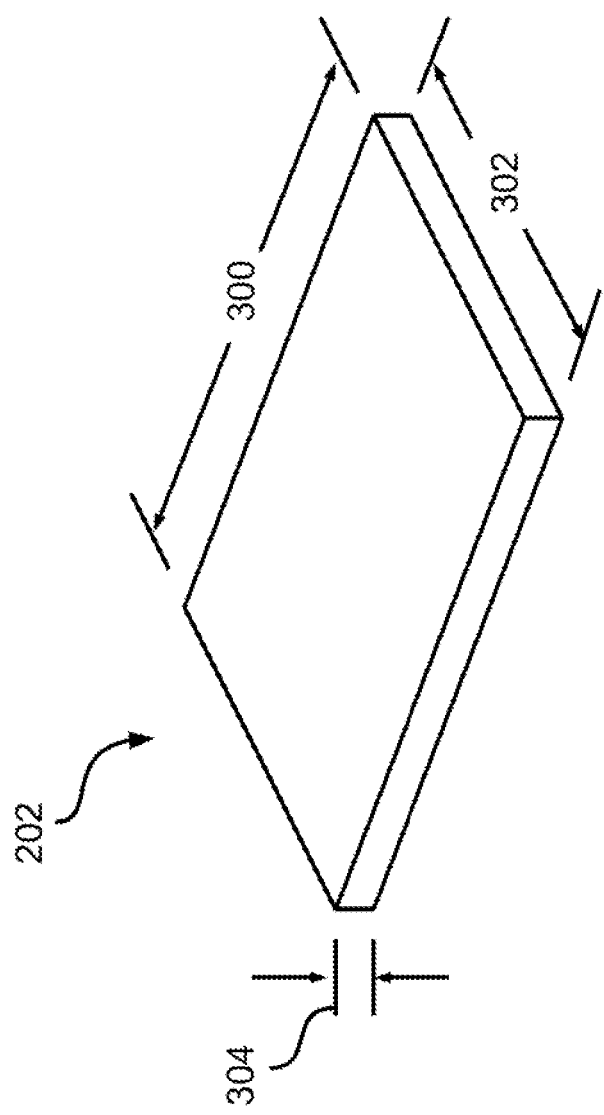
FIG. 3 is an isometric view of a particle within the coating formulation of FIG. 2 according to some embodiments of the present invention.

FIG. 3 illustrates one of the sheet particles 202, according to some embodiments, in greater detail. The sheet particle 202 is substantially plate-shaped and has, for example, a length 300 of between 300 and 500 nanometers (nm), a width 302 of between 150 and 250 nm, and a thickness 304 of less than 10 nm (e.g., between about 1 nm and 10 nm). It should be understood that the sheet particles 202 may vary in size. In some embodiments, the sheet particle(s) 202 is made of substantially pure silicon dioxide (i.e., no other materials may be present). In some embodiments in which the coating 200 is formed using a sol-gel system, the sheet particles 202 may be added via an aqueous solution/slurry, such as SUNLOVELY LFS HN-050 available from AGC Chemicals Americas, Inc., Exton, Pa. In some embodiments, the sheet particles are nano-clays, nano-mica flakes, LAPONITE available from Southern Clay Products, Inc., Gonzales, Tex., or any other transparent nano-material with flake/sheet/plate geometry (or a combination of any of the previously-mentioned particles).

Referring again to FIG. 2, in some embodiments, the nano-particles 204 are spherical particles having a width of, for example, between 3 and 50 nm. The nano-particles 204 may be made of, for example, metals oxides, such as titanium oxide silica, and fluorine-doped silica, metal fluorides, such as magnesium fluoride, and combinations thereof. It should be understood that in some embodiments, at least some of the nano-particles 204 are elongated, while in some embodiments, the nano-particles 204 are not included in the coating 200.

In some embodiments, the sheet particles 202 (perhaps in combination with the nano-particles 204) are provided in a water-based suspension combined with a polysiloxane (i.e., a hydrophilic) or silane emulsion, a polysiloxane or silane solution, or a combination thereof, which is used as the binder 206, but may also serve as a surfactant. As will be appreciated by one skilled in the art, emulsions are two-phase mixtures of liquids in which the two liquids are usually immiscible, while solutions are single-phase mixtures of solutions. Examples of suitable binder materials include water-soluble dipodal reactive silanes, such as aminoalkoxysilanes, glycidoxyalkoxysilanes, carboxylalkoxysilanes, hydrophilic alkoxysilanes, and combinations thereof.

Figure 4:
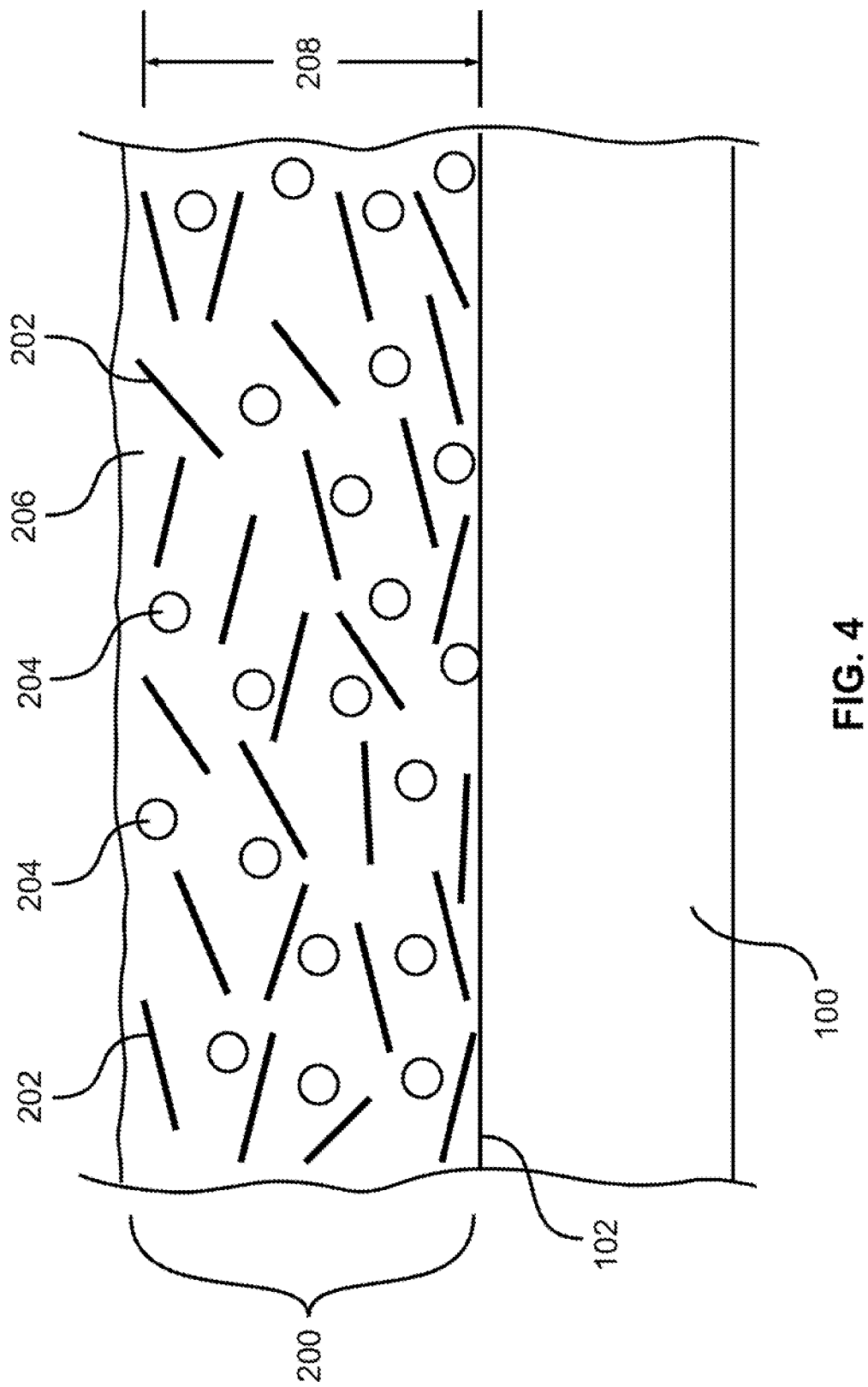
FIGS. 4 and 5 are cross-sectional views of the substrate of FIG. 2 illustrating a curing process of the coating formulation and the formation of an anti-reflection coating according to some embodiments of the present invention.
Figure 5:
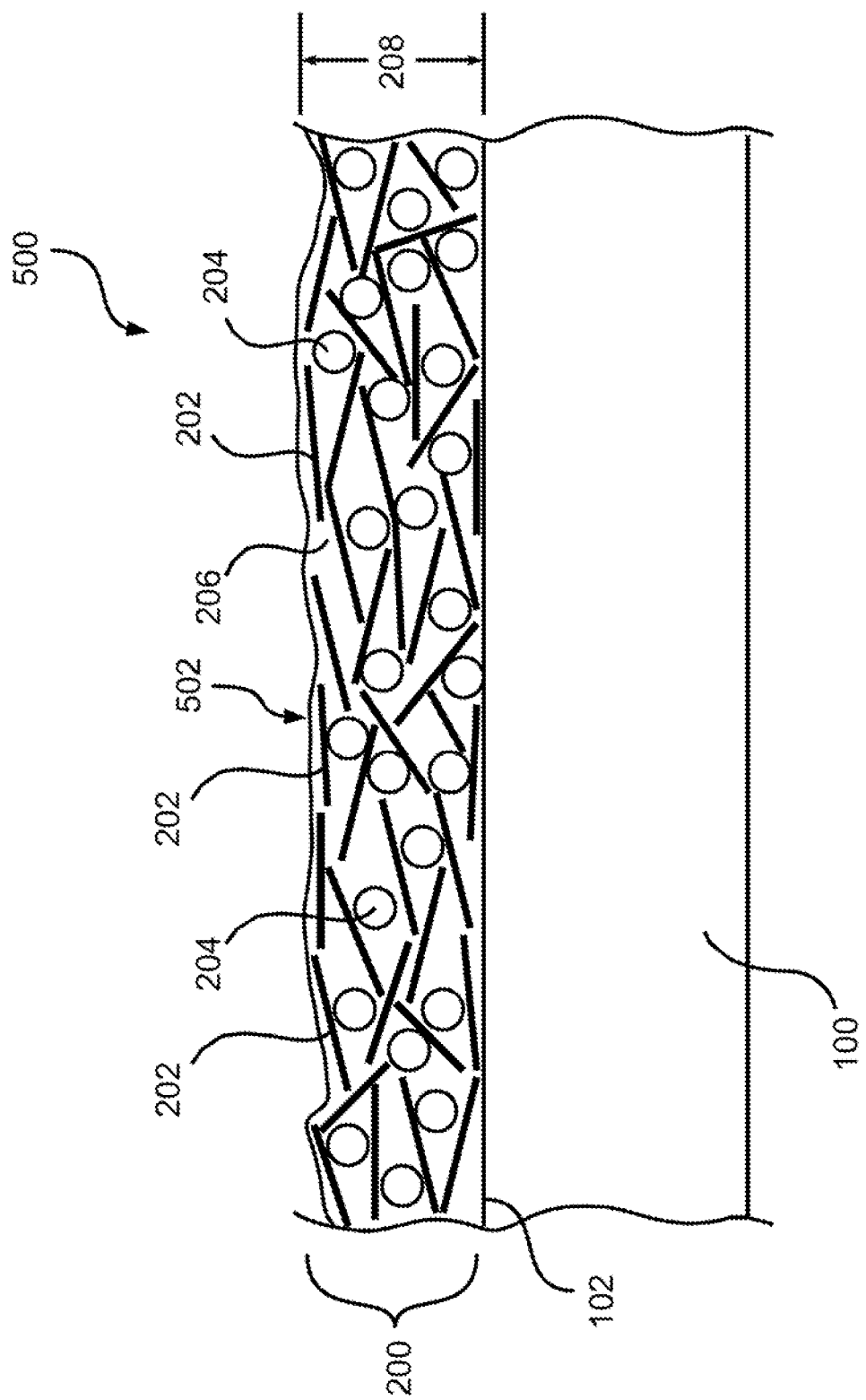

FIGS. 4 and 5 illustrate the coating formulation 200 during, and after, a curing process. In some embodiments, solvents in the formulation 200 may be removed and/or the formulation 200 may be cured using, for example, a thermal cure, a UV cure, or a combination thereof. In some embodiments utilizing a thermal cure, depending on the chemistry used, the formulation 200 may be rapidly cured during tempering of the substrate (e.g., 650° C.-700° C.), if so desired, or at lower temperatures (e.g., 100° C.-500° C.) when it is not desirable for the particular substrate to reach annealing temperatures. As is apparent when comparing FIGS. 2, 4, and 5, during the curing process, the thickness 208 of the formulation 200 is reduced as, for example, solvents/liquids in the formulation 200 are removed while the sheet particles 202 and the nano-particles 204 are brought closer together, eventually forming the structures shown in FIG. 5. During the curing process, the polysiloxane or silane emulsion or a polysiloxane or silane solution may be converted to silicon oxide and act as a cement (i.e., binder), thus increasing adhesion and cohesion of the coating.

FIG. 5 illustrates the coating formulation 200 after the curing process, according to some embodiments. More specifically, FIG. 5 illustrates a coated article 500 that includes the transparent substrate 100 and an optical coating (or anti-reflection coating) 200 (formed from the cured coating formulation 200) above the transparent substrate 100. It should be noted that in FIG. 5 the binder 206 may appear to substantially form the structure of the coating 200. However, the actual structure of the coating 200 may be substantially formed by the particles 202 and 204, which are held together, or in place, by the binder 206. In some embodiments, after curing, the coating 200 has a thickness 208 of between about 100 and 150 nm, as measured between the upper surface 102 of the substrate 100 and an upper surface 502 of the coating 200.

The sheet particles 202 are arranged in various ways within the anti-reflection coating 200. For, example, some of the sheet particles 202 are essentially stacked in a "flat" manner, while others interact in such a way that irregular structures are formed, resulting in "pores" (i.e., spaces between the particles) being formed. For example, some of the sheet particles 202 may form relatively organized arrangements, similar to a "house of cards" due to differences between the surface charges at the edges and faces thereof, resulting in a large, regular porosity. The nano-particles 204 are dispersed throughout the coating 200, within the various spaces and/or pores formed between the sheet particles 202.

The anti-reflection coatings formed in accordance with embodiments described herein provide improved interfacial contact area derived from the large contact area provided by the sheet particles 202, which are the primary film former. The nano-particles 204 may serve as porosity modifiers, acting as spacers between the sheet particles 202 at low concentrations (i.e., to increase porosity and lower refractive index) and as fillers at high concentrations (i.e., to decrease porosity and increase refractive index). As such, the porosity and refractive index of the coating 200 may be controlled by adjusting the ratio(s) of spherical (and/or elongated) nanoparticles 204 to sheet particles 202. In some embodiments, the coating 200 has a refractive index between about 1.10 to 1.50.

The nano-sheet geometry allows for an anti-reflection coating to be formed with less open pores than similar porosity coatings produced from other particle geometries, which may result in improved chemical and environmental durability due to the reduction of accessible surface of the coating 200 and substrate 100, as well as due to the greater diffusion path length that attacking chemical species must travel to penetrate the film.

The polysiloxane surfactant emulsion and/or reactive silane solution (or emulsion) may also improve the wetting characteristics of the formulations on glass or polymeric substrates, in addition to serving as a binder when cured (e.g., via thermal or UV radiation), thus increasing the interfacial contact area of the particle network, as well as that between the particles and substrate, due to the polysiloxane/reactive silane preference for migrating to the contact points the metal oxide or metal fluoride particles and substrate. This may be driven by the lowering of the surface free energy of the polysiloxane/reactive silane in an aqueous environment, which results in a spontaneous migration to the interfaces between the particles and the substrate, where the polysiloxane/reactive silane may collect. The migration effect of the polysiloxane or reactive silane to the contact points is further promoted by concentration due to the loss of water during the drying of the wet coating. At low concentrations the polysiloxane/reactive silane acts as wetting agent and binder with little effect on the refractive index of the final coating, while at higher concentrations the binder effect is increased and the effect on the refractive index becomes more complicated as the emulsion may begin to act as a porogen as well when the coating is thermally processed above the temperature required to evaporate water and/or pyrolyze carbon from the polysiloxane or reactive silane.

The sheet particles 202 may have surface chemistries that are easily manipulated in aqueous systems to allow control over coating and gelation behavior, allowing them to produce conformal coatings without use of organic additives which require removal from the final film.

In some embodiments, surface modification of the substrate (e.g., a glass substrate) with cationic (e.g., amine or ammonium) or anionic (e.g., carboxylate) layer may be used to manipulate the structure of the interfacial layer by exploiting electrostatic effects between the charged surfaces of the particles and the substrate.

It should be noted that aqueous dispersions of metal oxide particles (e.g., the sheet particles 202 and the nano-particles 204) and polysiloxane emulsions are considered "green" chemistries, as are most reactive silane emulsions, resulting in non-toxic, non-flammable coating formulations which have greatly reduced costs related to handling, transportation, storage, safety, and disposal. As such, the use of water as the primary solvent leads to significant cost savings when compared with organic solvents.

The methods described herein also provide for improved mechanical durability for the coatings prior to heat treatment or curing. Thus, handling of the panels is facilitated, which allows for improved yields due to decreased loss from marring during handling. Additionally, an improved process window between coating and curing of film is provided. Further, improved mechanical, chemical, and environmental durability of the cured coating may be provided, thereby increasing the longevity of the service life of the coatings. Solvent costs are also reduced when compared to traditional methods, and tunable optical properties are provided.

The methods described here also provide for improved manipulation of the refractive index range of the coatings when compared to traditional (e.g., spherical) nano-particle xerogel anti-reflection coatings, including nano-particle-binder and all nano-particle xerogels. Thermal processing requirements to produce durable, cured coatings are also reduced due to higher density of silanol (Si—OH per unit mass) reactive groups in the sheet particles than other particle geometries, resulting in greater covalent bond densities at lower temperature than is possible with xerogel coatings using other particle geometries.

It should also be noted that UV curing options exist for aqueous emulsions of polysiloxane and reactive silanes used as wetting agents and binders. UV or e-beam curing may be used to rapidly induce gelation of the coating, prior to a final thermal curing, or even as the primary curing process used in conjunction with a lower temperature (e.g., less than 300° C.) drying process.

Figure 6:
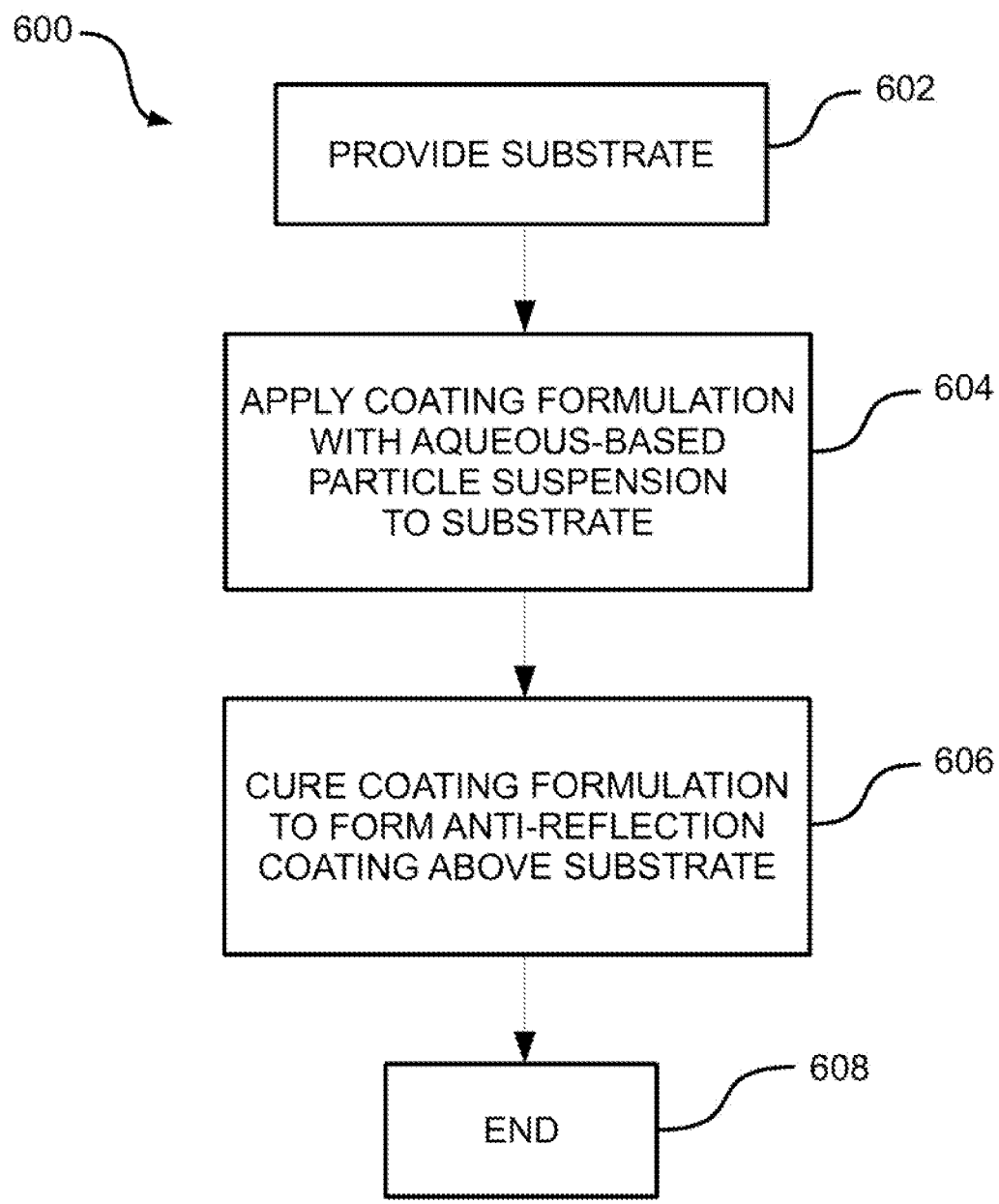
FIG. 6 is a flow chart of a method for forming an anti-reflection coating, or for forming a coated article, according to some embodiments.

FIG. 6 illustrates a method 600 for forming an anti-reflection coating, or for forming a coated article, such as an anti-reflection panel, according to some embodiments. At step 602, the method 600 begins by providing a substrate, such as the transparent substrate 100 described above. At step 604, a coating formulation is applied to the substrate. The coating formulation includes an aqueous-based suspension of particles, such as those described above. At step 606, the coating formulation is cured (e.g., via thermal, UV, or a combination cure) to form an anti-reflection coating above the substrate. At step 608, the method 600 ends.

Thus, in some embodiments, a coating formulation is provided. The coating formulation includes an aqueous-based suspension of particles. The particles have a sheet-like morphology and a thickness of less than about 10 nm. The coating formulation also includes a polysiloxane or silane emulsion, a polysiloxane or silane solution, or a combination thereof.

In some embodiments, a method for coating an article is provided. A substrate is provided. A coating formulation is applied to the substrate. The coating formulation includes an aqueous-based suspension of particles. The particles have a sheet-like morphology and a thickness of less than about 10 nm. The coating formulation is cured to form a coating above the substrate.

In some embodiments, a coated article is provided. The coated article includes a substrate and an anti-reflection coating formed above the substrate. The anti-reflection coating includes an aqueous-based suspension of particles. The particles have a sheet-like morphology and a thickness of less than about 10 nm.

Although the foregoing examples have been described in some detail for purposes of clarity of understanding, the invention is not limited to the details provided. There are many alternative ways of implementing the invention. The disclosed examples are illustrative and not restrictive.

What is claimed:
1. A coating formulation comprising:
    an aqueous-based suspension of particles, wherein the particles have a sheet-like morphology and a thickness of less than about 10 nanometers (nm); and
    a carboxylalkoxysilane.
2. The coating formulation of claim 1, wherein the coating formulation further comprises a plurality of nano-particles.
3. The coating formulation of claim 2, wherein each of the nano-particles has a width of between about 3 and 50 nm.
4. The coating formulation of claim 3, wherein the nano-particles comprise a metal fluoride.

5. The coating formulation of claim 4, wherein the nanoparticles comprise magnesium fluoride.

6. The coating formulation of claim 1, wherein the particles comprise silicon oxide.

7. The coating formulation of claim 1, wherein the coating formulation is a sol-gel formulation.

8. A method for coating an article, the method comprising:
providing a substrate;
applying a coating formulation to the substrate, the coating formulation comprising an aqueous-based suspension of particles and a carboxylalkoxysilane, wherein the particles have a sheet-like morphology and a thickness of less than about 10 nanometers (nm); and
curing the coating formulation to form a coating above the substrate.

9. The method of claim 8, wherein the substrate is transparent.

10. The method of claim 8, wherein the particles comprise silicon oxide.

11. The method of claim 8, wherein the coating formulation further comprises a plurality of nano-particles, each of the nano-particles having a width of between about 3 and 50 nm and comprising a metal fluoride.

12. The method of claim 11, wherein the coating has a refractive index of between 1.10 and 1.50.

13. The method of claim 12, wherein the coating has a thickness of between 100 and 150 nm.

14. The method of claim 8, wherein the curing the coating formulation comprises an ultraviolet (UV) cure, a thermal cure, or a combination thereof.

15. The method of claim 8, wherein the coating formulation is a sol-gel formulation.

16. A coated article comprising:
a substrate; and
a coating formed above the substrate, the coating comprising an aqueous-based suspension of particles and a carboxylalkoxysilane, wherein the particles have a sheet-like morphology and a thickness of less than about 10 nanometers (nm).

17. The coated article of claim 16, wherein the coating has a thickness of between 100 and 150 nm.

18. The coated article of claim 17, wherein the coating has a refractive index of between 1.10 and 1.50.

19. The coated article of claim 16, wherein the substrate is transparent.

20. The coated article of claim 16, wherein the coating further comprises a plurality of nano-particles, each of the nano-particles having a width of between about 3 and 50 nm and comprising a metal fluoride.

* * * * *